United States Patent [19]

Kishine et al.

[11] Patent Number: 4,642,720
[45] Date of Patent: Feb. 10, 1987

[54] MAGNETIC HEAD COMPRISED OF AN IMPROVED BASE SUBSTANCE FOR HIGH DENSITY MAGNETIC RECORDING

[75] Inventors: Nobuyuki Kishine; Tetsuya Imamura, both of Tochigi; Michihide Yamauchi, Wakayama; Tsuyoshi Ootani, Tochigi, all of Japan

[73] Assignee: Kao Corporation, Tokyo, Japan

[21] Appl. No.: 548,566

[22] Filed: Nov. 3, 1983

[30] Foreign Application Priority Data

Nov. 4, 1982 [JP] Japan .................................. 57-194013
Jan. 11, 1983 [JP] Japan .................................. 58-3124
Feb. 8, 1983 [JP] Japan .................................. 58-19293
Mar. 15, 1983 [JP] Japan .................................. 58-41471

[51] Int. Cl.⁴ ........................ G11B 5/187; G11B 5/147
[52] U.S. Cl. ..................................... 360/126; 360/122
[58] Field of Search ............... 360/103, 122, 125, 126, 360/127, 134; 29/603, 602

[56] References Cited

U.S. PATENT DOCUMENTS 4,242,710  12/1980  Hempstead et al. ................. 360/126

FOREIGN PATENT DOCUMENTS

5466451   11/1977  Japan .................................... 29/602
54-28109   2/1979  Japan ................................... 360/122
56-87216   7/1981  Japan ................................... 360/125
5911518    7/1982  Japan ................................... 360/125
58-80122   5/1983  Japan ................................... 360/125
6015811    7/1983  Japan .................................... 29/603
8203938   11/1982  PCT Int'l Appl. ................. 360/125

Primary Examiner—Robert S. Tupper
Assistant Examiner—Melissa J. Koval
Attorney, Agent, or Firm—Cushman, Darby & Cushman

[57] ABSTRACT

A magnetic head is disclosed in which a non-magnetic base substance which supports a writing or reading converter for writing or reading on a magnetic recording medium is constructed with an aggregate of carbon material, or a composite material comprising an aggregate of carbon material, and a thermosetting resin and/or a carbonaceous filler.

12 Claims, 18 Drawing Figures

MAGNETIC HEAD COMPRISED OF AN IMPROVED BASE SUBSTANCE FOR HIGH DENSITY MAGNETIC RECORDING

BACKGROUND OF THE INVENTION

1. Field of the Invention:

The present invention relates to a base substance for a magnetic head which writes or reads on a magnetic recording medium, and more particularly to an improvement of the material forming the base substance for a magnetic head suitable for high density magnetic recording.

2. Description of the Prior Art:

The demand for higher density in magnetic recording has grown in recent years with the increase of information available to be magnetically stored. In order to magnetically store more information, improvements of various components, such as magnetic recording heads and novel magnetic recording systems are actively underway.

With regard to the magnetic head, a general purpose ring type magnetic recording head made of a ferritic core was considered limited in its capacity for high density magnetic recording. Thin film magnetic recording heads such as disclosed in Jap. Pat. Appln. Laid-open No. Sho 55-84018 have been developed to replace the conventional heads.

The core material used to make these thin film magnetic heads is made of permalloy which has marked magnetic permeability at high frequency and saturated magnetic flux density as compared with a ferritic core. The magnetic field of the head which is responsible for recording switches very rapidly and is capable of recording with high resolution. Because of smaller inductance, therefore, it can be used over a wider frequency range. Conveniently the principal components of the thin film-type magnetic heads are formed by a vacuum evaporating process or a sputtering process. Such heads are easier to produce and require less mechanical workings and therefore offer an excellent magnetic head.

The combination of a thin film magnetic recording head having excellent characteristics as mentioned above with a magnetic recording medium of metallic thin film or of film coated with γ-type diiron trioxide adherent to cobalt will allow high density magnetic recording.

Figure 1:
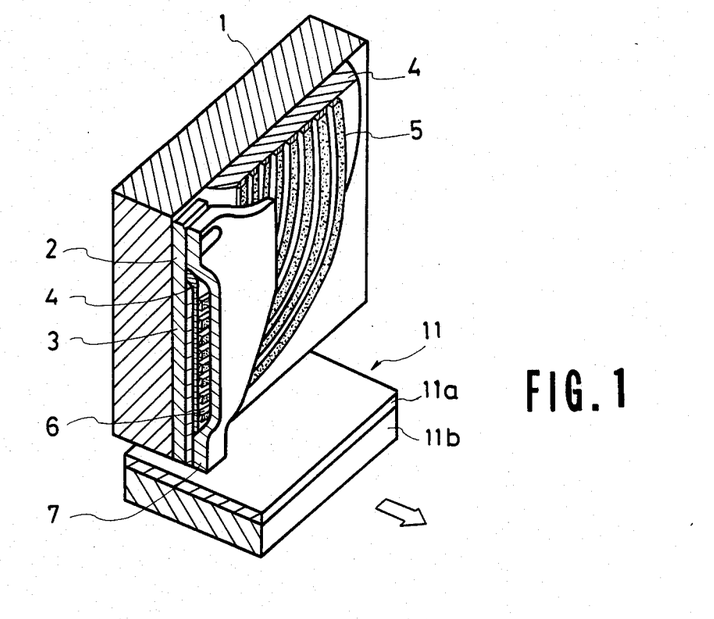
FIG. 1 is a perspective view showing the essential parts of the conventional thin film magnetic head in actual use.
Figure 2:
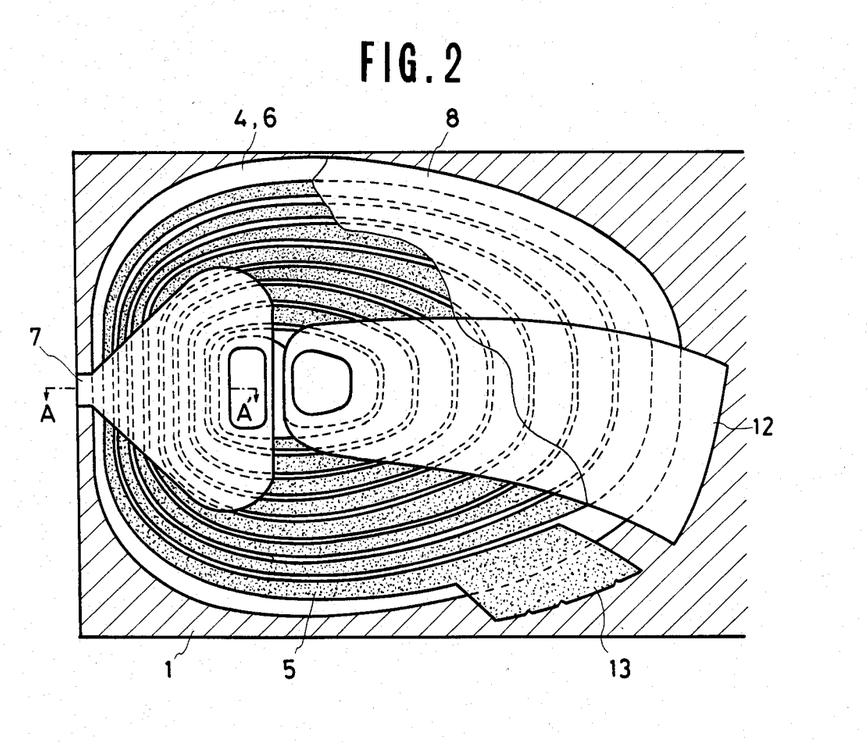
FIG. 2 is a plane view of the thin film magnetic head with its protective plate of nonmagnetic base removed.
Figure 3:
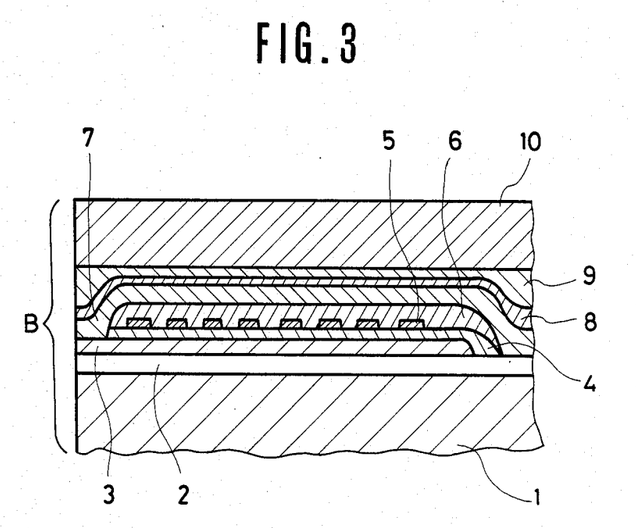
FIG. 3 is a sectional view of FIG. 2 at line AA'.

FIGS. 1 through 3 show the structure of a conventional thin film magnetic head. In FIGS. 1 through 3, reference numeral 1 denotes a non-magnetic base substance in a plate form which is made of an alumina ceramic 1 to 5 mm thick having a sufficiently smooth surface for evaporating a film of permalloy 2 thereon. The permalloy film 2 is the bottom magnetic pole made of a magnetic soft metal film is formed on the surface of the non-magnetic base 1 by evaporating or sputtering. An alumina film 3 which is a non-magnetic insulation film is formed over the permalloy film 2 by sputtering to act as a gap spacer.

The core is formed as follows: a thick photo-resist film 4 is superposed on the alumina film 3 and consecutively superposed with a thin film coil 5 of a one layer spiral having eight turns. A photo-resist film 6 is formed over the thin film coil 5, and a permalloy film 7 as the upper magnetic pole is further evaporated on the photo-resist film 6.

As shown in FIG. 3, an alumina film 8 is formed by sputtering the permalloy film 7 as the upper magnetic pole to protect the thin film coil 5. A non-magnetic protective plate 10 is bonded to the upper surface of the alumina film 8 by means of a glass layer 9 which is adhesive at a relatively low temperature. The non-magnetic protective plate 10 is less than 100 μm in thickness, protects entire thickness from the permalloy film 2 as the bottom magnetic pole to the alumina film 8 and is made mainly of silica ($SiO_2$). The non-magnetic protective plate 10 and the upper surface of the non-magnetic base 1 (the surface is indicated as B in FIG. 3) come in contact with the magnetic recording medium. Since the non-magnetic protective plate 10 is relatively thinner than the non-magnetic base 1, it is the non-magnetic base 1 which primarily contacts the magnetic recording medium. Reference number 11 in FIG. 1 denotes the magnetic recording medium which comprises a magnetic layer 11a and a non-magnetic layer 11b. In FIG. 2, reference numerals 12 and 13 denote electric signal terminals.

Since the upper surface of the conventional non-magnetic base for a thin film magnetic head is formed by evaporation or sputtering, alumina ceramics are often used for the desirable property of providing a smoother surface for the base. However, alumina ceramics are so hard that the surface of the recording medium which slides over the non-magnetic base is likely to be injured. Particularly when the thin film magnetic head is used as the recording medium for a metallic thin film magnetic disc or a magnetic tape, the metallic film surface of the recording medium is less coarse and thus the actual area in contact with the thin film magnetic head increases. This deteriorates the slidability between the magnetic head and the recording medium and causes damage to the recording medium.

With regard to the magnetic recording system, it has been logically proven that the conventional longitudinal magnetic recording system is also limited in its capacity for high density recording (Iwasaki, Institute of Electronics and Communication Engineering of Japan, Research Information on Magnetic Recording MR72-7, 1972, 6; and S. Iwasaki & K. Takamura, IEEE Tras. on Magn. MAG-11, No. 5, 1173–1175, 1980). A perpendicular magnetic recording system has since been proposed as an alternative system for increasing the recording density.

Figure 4:
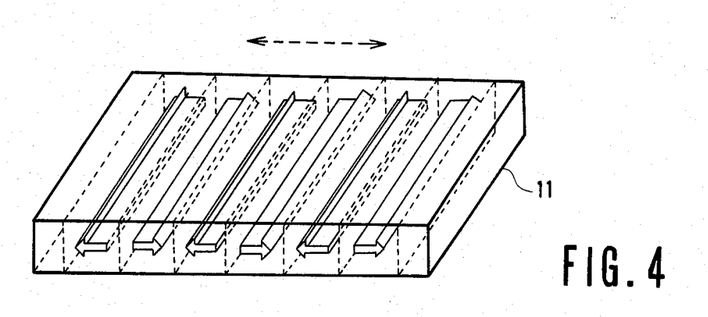
FIG. 4 is a perspective view illustrating the orientation of the axis of easy magnetization in the recording medium for a longitudinal magnetic recording system.
Figure 5:
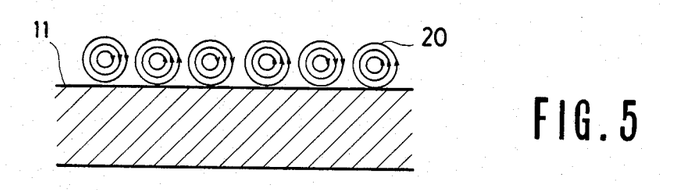
FIG. 5 is a sectional view of the recording medium shown in FIG. 4 to indicate the circular mode of magnetization thereof.

Referring to FIG. 4, it is seen that the longitudinal magnetic recording system has the axis of easy magnetization in the direction the recording medium 11 advances denoted as arrows with broken lines. As the recording density is increased, circular modes of magnetization 20, as indicated by the arrows in FIG. 5, will be generated because of the demagnetizing field. When these circular modes of magnetization approach each other, the direction of their rotation becomes undiscernible, making magnetic recording and reproducing impossible.

Figure 6:
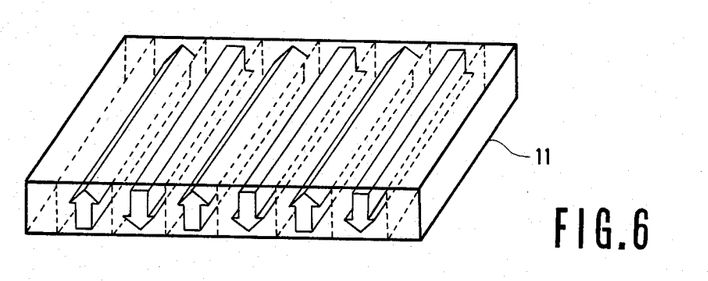
FIG. 6 is a perspective view depicting the orientation of the axis of easy magnetization in the recording medium for a perpendicular magnetic recording system.

On the other hand, the perpendicular magnetic recording system as shown in FIG. 6 gives rise to parallel magnetism in which the direction alternates at every half-wave length of the signal. The adjacent residual magnetization blocks attract each other so that the system stays stable, is free from the demagnetizing field which is the source of problem in the longitudinal magnetic recording, and thus causes the magnetism to switch sharply. Since this switching of the magnetism is also retained even when the recording density is increased, the perpendicular magnetic recording system utilizes the attraction force of the magnet and is therefore very rational and advantageous in increasing the density of the magnetic recording.

Figure 7:
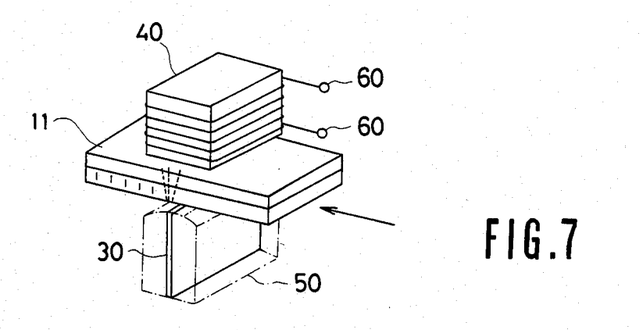
FIG. 7 is a perspective view representing the basic structure of a magnetic head for a perpendicular magnetic recording system.

FIG. 7 shows the fundamental structure of a magnetic head for use in perpendicular magnetic recording system. The conventional magnetic head comprises a main pole head 30 vertically in contact with the surface of the recording medium 11 and an auxiliary pole head 40 not in contact with the recording medium 11. The main pole head 30 is less than 1 μm in thickness and is a thin film made of magnetic soft metal usually surrounded by a support member 50 for protection. Reference numeral 60 denotes electric signal terminals.

Attempts have been made to employ thermosetting resins, such as epoxy resin, or thermoplastic resins, such as methylmethacrylate resin, for the support member 50 which protects this thin film of magnetic soft metal. However, these materials are defective in that the life of the support member becomes shorter because these resins lack the hardness to withstand the abrasion when the Co-Cr sputtering film, which is generally used as the recording medium in a perpendicular magnetic recording system, moves in the direction of the arrow in FIG. 7 in contact with the resinous surface.

The use of very hard alumina ceramics as the support member has been proposed to obviate such problems, but in this case, both the recording medium and the support member are so hard that use of lubricant becomes indispensable to insure smooth sliding between the two surfaces. Fluorocarbon compounds, such as Krytox manufactured by DuPont, USA, and amide compounds can be used as the lubricant to be applied on the support member at the time of sliding. Slidability of the Co-Cr sputtering film with alumina ceramics can be improved by such lubricants. However, it was difficult to retain its action for a long time as the lubricant easily volatilizes.

There is also an increasing demand for higher density in the longitudinal magnetic recording system that is widely used in audio tape recorders and video tape recorders in conjunction with the trend toward higher performance and extremely compact devices.

It is necessary to use a magnetic recording medium of high coercive force for realizing higher recording density, and in turn development of a magnetic head having greater magnetic intensity at the time of recording is desired. In other words, a magnetic head which is compatible in performance with the magnetic recording medium of higher coercive force must be capable of generating a strong leakage magnetic field at the front gap. The core material for a general purpose video magnetic head is at present a magnetic material. Mn-Zn ferritic material is typically used as the head material for its balanced properties and workability. However, the head chip of a magnetic head made of oxidized magnetic material would likely be saturated if the current for recording is increased to magnetize the recording medium of high coercive force such as metal tape, and this would cause the recording magnetic field to expand too much to sufficiently magnetize the tape, rendering the head incompatible with metal tape.

Generally, the saturated magnetic flux density (Bs) of magnetic material for the magnetic head is required to be greater than the coercive force (Hc) of the magnetic recording medium a factor of at least 6. For example, a magnetic head made of Mn-Zn ferrite whose Bs is approximately 5000 G (Gauss) cannot sufficiently record on a magnetic recording medium with coercive force of about 1000 to 2000 Oe (Oersted).

A magnetic head made of a magnetic metal material, such as sendust alloy or an amorphous alloy of the Co-Nb-B group, which is about twice as great in Bs as the oxidized magnetic material, such as Mn-Zn ferrite, will be adequate to record on a recording medium with Hc of up to about 15000 Oe. Development of magnetic heads using a magnetic metal material of this type has been active in recent years, but magnetic metal materials are defective in that: (1) theei resistivity is very small; (2) magnetic permeability at the higher frequency band is low; and (3) they are inferior in wear resistance. Among these defects, (1) and (2) can probably be dealt with by forming the magnetic metal material into a thin strip, which in turn provides a magnetic head with a narrow track width suitable for higher density recording. However, the problem of inferior wear resistance as mentioned in (3), above, still remains unsolved even if the metal is made into a thin strip.

Attempts have been made to overcome the problem by supporting the thin strip of metal with a material having excellent wear resistance. Alumina ceramics and very hard glass have been proposed as materials for such a support member which is excellent in wear resistance, very hard, have a smooth surface and are readily available. However, the resulting magnetic head incorporating a support member of this type is too hard and lacks the required slidability with the magnetic recording medium and thus causes damage to the same.

In order to overcome the above-mentioned defect, it has been suggested to apply lubricant over the surface of the magnetic recording medium or to coat the medium with a protective film. The use of lubricant is disadvantageous in that it is difficult to retain the lubricating action for a long time because the lubricant volatilizes and requires periodic re-application. The protective film is defective because it involves an extra process for applying such a film and the protective film adds an extra gap between the magnetic head and the recording medium thereby making higher density recording difficult.

SUMMARY OF THE INVENTION

The present invention aims to overcome the defects mentioned above, and more particularly it aims to provide a magnetic head which is characterized in that it does not require the application of lubricant on the surface of the magnetic recording medium nor the provision of protective film on said medium, leaves no permanent damage on the surface of the recording medium, causes less friction on the surface in contact with the magnetic recording medium and can be formed with a thin film having highly smooth surface with specular finish and excellent magnetic properties.

The present invention is characterized by a non-magnetic base substance which supports a converter for writing or reading on a magnetic recording medium and is constructed with an aggregate of carbon material or a composite material comprising an aggregate of carbon material and thermosetting resin and/or carbonaceous filler.

Preferably the carbon material is a glass-like carbon material or crystalline carbon material.

The magnetic head according to the present invention is suitable as a head for a perpendicular recording system, a thin film-type and longitudinal recording system. The surface of the magnetic head for a perpendicular recording system and the surface on which a thin film is formed for a head of the thin film-type are preferably highly smooth and formed to have a density of 1.40 g/cm$^3$ or more.

The phrase "highly smooth surface" as used herein and in the appended claims means that the surface on which a thin film is to be formed is without voids greater than 0.5 μm in diameter.

DETAILED DESCRIPTION OF THE INVENTION

First, the non-magnetic substance according to the present invention is constructed with an aggregate of carbon material. The carbon material must be such that its wear resistance allows it to be worn before the magnetic recording medium or its protective film is damaged as the magnetic head slides over the recording medium. Either glass-like carbon material or crystalline carbon material is preferable.

The following may be used as the carbon material in the present invention: Carbon material obtained by carbonizing a thermosetting resin or resin which is denaturalized to be thermosetting through copolymerization or co-condensation, carbon material obtained by chemically treating to significantly deter the crystallization during hardening or carbonizing process; and carbon material obtained by thermo-decomposing hydrocarbons of lower molecular weight such as methane, ethylene, benzene, etc., in the gas-phase and the like. For example, carbon materials of polyacrylonitriles, rayons, pitches, lignins, phenols, furans, alkyd resins, unsaturated polyesters, xylene resins and black lead, carbon black, coke, pitch, etc., can be used. The carbon material may comprise an aggregate of carbon materials in any form such as fibers, particles or lumps.

In a second embodiment, the non-magnetic base substance according to the present invention is constructed with an aggregate comprising a composite material containing said carbon material and thermosetting resin and/or carbonaceous filler. Phenol resin, epoxy resin, polyester resin, furan resin, urea resin, melamine resin, alkyd resin, xylene resin, etc., can be used as the thermosetting resin. Carbonaceous filler a used herein refers to carbon materials in general, for example, natural substances such as lignin and pitch with a high residual carbon content, artificial black lead obtained by sintering thermoplastic resins, carbon black manufactured by the furnace method or impact method, natural graphite and the like can be used.

Said thermosetting resin is used as a binder to firmly bind the carbon materials themselves or the carbon materials with the carbonaceous filler. Addition of the resin will result in a tough composite material aggregate which is resistant to mechanical destruction such as collision. Also, inclusion of the carbonaceous filler into the thermosetting resin facilitates carbonization of the thermosetting resin to obtain the carbon material for use in the present invention. Too great an amount of thermosetting resin or carbonaceous filler contained in the carbon material would make the matetial too susceptible to wear; therefore, it is preferable that glass-like carbon material be contained in the composite material in an amount of more than 40% by volume, or still preferably more than 50% by volume.

An aggregate of carbon material or an aggregate of composite material comprising the carbon material and thermosetting resin and the like to construct a base substance for the magnetic head can be manufactured by various molding procedures well known in the art such as by case molding, compression molding, extrusion molding, or the like.

The thin film-type magnetic head according to the present invention which is supported by the non-magnetic base substance is particularly effective in preventing the magnetic recording medium of a thin metal film from damage but can also be used with a magnetic recording medium of a film coated with γ-type diiron trioxide adherent to Co.

The magnetic soft metal film to be used as the main magnetic head for a perpendicular magnetic recording system which is to be supported by the non-magnetic base substance according to the present invention is selected from materials shown below in Table 1 which have high magnetic permeability and maximum magnetic flux density and yet are extremely low in coercive force.

These magnetic soft metal materials are manufactured by sputtering methods or super rapid cooling methods.

TABLE 1

| Property | | Perm­alloy | Al­perm | Sen­dust | Boro­cube |
| --- | --- | --- | --- | --- | --- |
| Composition | | Ni 78 | Al 16 | Al 6.2 | Co 73.5 |
| (Weight %) | | Mo 5 | Fe 84 | Si 9.6 | Fe 15.5 |
| | | Fe 17 | | Fe 84.2 | Al 6.0 |
| Initial | DC | 70,000 | 2,900 | 31,000 | 12,000 |
| Magnetic | 4 MHz | — | — | — | — |
| Permeability | | | | | |
| Maximum Magnetic | | 7,900 | 8,000 | 9,900 | 7,500 |
| Flux Density (G) | | | | | |
| Coercive Force (Oe) | | 0.006 | 0.025 | 0.025 | 0.05 |

When the magnetic head according to the present invention is used as a thin film type or perpendicular type recording head for a magnetic recording system, it is preferable that the surface of the base substance on which the thin film is to be formed contain no voids 0.5 μm or more in diameter and that it has a density of 1.40 g/cm$^3$ or more, so that a thin film of excellent magnetic properties can be formed thereon. Although the density of the base substance is irrelevant to the formation of a thin film having excellent magnetic properties, a base substance having a density of 1.50 g/cm$^3$ or less is likely to contain numerous voids inside even if the voids on the surface on which the thin film is to be formed are smaller than 0.5 μm in diameter. This makes it difficult to obtain the vacuum state necessary for the sputtering or evaporating process; or, the wear of the head when it is in contact with the magnetic recording medium would be too great to achieve the objects of the present invention. If the surface of the base substance on which a thin film is to be formed is free from any void greater than 0.1 μm in diameter, then a thin film with still better magnetic properties can be formed on said surface.

To obtain a base substance which contains no voids greater than 0.5 μm in diameter but has a density of 1.40 g/cm$^3$ or more, an aggregate must be prepared by the following process. When cast molding is employed, the hardening agent must be uniformly dispersed at the stage of obtaining a precursor of the carbon material (thermosetting resin hardened by a hardening agent or heat), or uniformly heated while adjusting the reaction so that the rate of hardening should not be too quick. When compression or extrusion molding is employed, a carbon material must be wetted with a thermosetting resin to reduce the gap as much as possible before molding.

Use of the aggregate of carbon material or the aggregate of composite material according to the present invention as mentioned above will be desirable in components other than the base substance which comes in contact with the recording medium because of sustained lubricating effect which such materials impart to the components in contact with the recording medium. These structures include the protective plate for the thin film magnetic head and the support member for the magnetic soft metal film of a perpendicular recording system.

As has been described in the foregoing, the magnetic head according to the present invention is capable of sustaining the lubricating action for a longer period of time without using lubricant when it is in contact with the magnetic recording medium, causing no damage to the recording medium surface and little wear to the non-magnetic base substance itself.

The non-magnetic base substance has a particularly high mechanical strength as well as high density as it is made of a composite material comprising a carbon material and a thermosetting resin.

Also, this non-magnetic base substance is superior in surface smoothness which is required of a base substance for forming thin film. By further improving the surface smoothness by providing it with a specular surface finish, a thin film having excellent magnetic properties can be formed on the surface of the base substance by sputtering or evaporating.

Electric conductivity of the carbon material will prevent static electricity and thus the non-magnetic base substance and the recording medium would collect no dust.

The invention will be further described with reference to the following examples.

DESCRIPTION OF THE PREFERRED EMBODIMENTS

A first series of experiments was undertaken to study the effect of surface abrasion of various model base substances on representative high density recording media.

EXAMPLE 1

Figure 8:
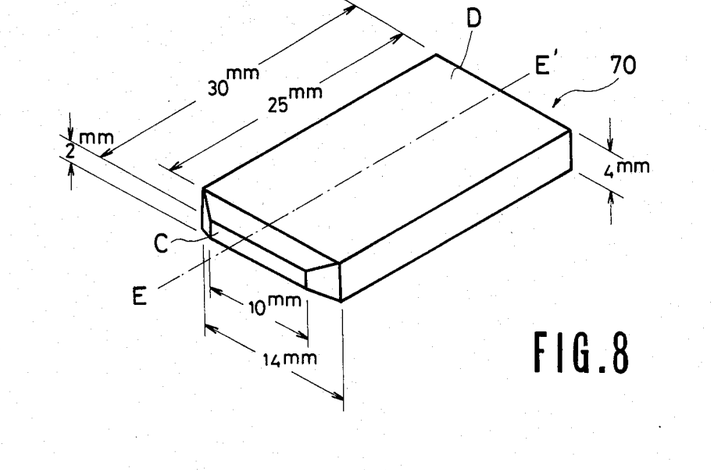
FIG. 8 is a perspective view of a model base substance according to one embodiment of the present invention.

A glass-like carbon material with an apparent density (specific gravity) of 1.49, shore hardness of 112 and thermal conductivity of 3 Kcal/m hr°C. was cut out into the shape and size (unit: mm) shown in FIG. 8. The surface C, to be placed in sliding abutment with the recording medium was gradually subjected to coarse to fine grinding followed by specular surface finishing with emery paper #15000 to prepare a model base substance 70 in the shape substantially quadrangular cylinder.

EXAMPLE 2

A glass-like carbon material with an apparent density of 1.45, shore hardness of 78 and thermal conductivity of 25 Kcal/m hr°C. was used to prepare a model base substance by the same method and the identical shape and the size as in Example 1.

EXAMPLE 3

Phenolic glass-like carbon fiber (manufactured by Nippon Kynol under the registered trademark Kynol) and a laminating general use resol resin in mixing ratio by volume of 70:30, respectively, were molded by compression molding to obtain a composite of glass-like carbon materials. This composite of glass-like carbon materials was used to prepare a model base substance with the identical shape and size and by the same method as in Example 1.

EXAMPLE 4

A mixture of graphite and phenol resin (mixing ratio by volume=60:40) was sintered after compression molding. The resultant material was graphitized to obtain a carbon material with an apparent density of 1.7 and shore hardness of 85. In the manner of Example 1, this carbon material was used to prepare a model base substance with the identical shape and size as in Example.

EXAMPLE 5

A mixture of carbon black, coke and pitch with the mixing ratio by volume of 60:10:30 was cast molded and sintered at about 1,000° C. to obtain a carbon material.

This carbon material was used to prepare a model base substance with the identical shape and size as in Example 1 by the same method.

COMPARATIVE EXAMPLE 1

An alumina ceramic (manufactured by Nippon Denki Glass and identified by the commercial name of Neoceram) was used to prepare a model base substrate with the identical shape and size as in Example 1 by the same method.

COMPARATIVE EXAMPLE 2

General commercial use methylmethacrylate was used to prepare a model base substance with the identical shape and size as in Example 1 by the same method.

COMPARATIVE EXAMPLE 3

General commercial use PTFE (Teflon) resin was used to prepare a model base substance with the identical shape and size as in Example 1 by the same method.

Test Method

The dynamic friction property of each model base substance according to Examples 1-5 and Comparative Examples 1-3 with a recording media of Co-Cr sputtering film and metallic thin film (Ni-P plated film) and a model base substance of Examples 1-3 and Comparative Example 1 with the recording medium of film coated with $\gamma$-type diiron trioxide adherent to cobalt were respectively measured by an abrasion test device and the condition of the sliding surface C of the model base substance and the magnetic recording film surfazce was visually observed.

The result is shown below in Table 2. The device used for measurement is described in Japanese Patent Application Laid-open No. Sho 55-128142 which enables the measurement of a dynamic friction property in a condition that simulates actual use. "Overall evaluation" in the following table refers to the result of an overall evaluation incorporating both the sliding surface of the magnetic head and the film surface of magnetic recording medium.

TABLE 2

| Model Base Substance | Film of Recording Medium | Dynamic Friction Coefficient | Sliding Surface of Base Substance | Condition of Film Surface of Recording Medium | Overall Evaluation |
|---|---|---|---|---|---|
| Example 1 | Co—Cr sputtering film | 0.12 | Good | Good | Good |
|  | Ni—P plated film | 0.12 | Good | Good | Good |
|  | Co$\gamma$-Fe$_2$O$_3$ film | 0.18 | Good | Good | Good |
| Example 2 | Co—Cr sputtering film | 0.11 | Good | Good | Good |
|  | Ni—P plated film | 0.11 | Good | Good | Good |
|  | Co$\gamma$-Fe$_2$O$_3$ film | 0.17 | Good | Good | Good |
| Example 3 | Co—Cr sputtering film | 0.13 | Good | Good | Good |
|  | Ni—P plated film | 0.13 | Good | Good | Good |
|  | Co$\gamma$-Fe$_2$O$_3$ film | 0.15 | Good | Good | Good |
| Example 4 | Co—Cr sputtering film | 0.10 | Slightly Good | Good | Slightly good |
| Example 5 | Co—Cr sputtering film | 0.15 | Slightly | Good | Slightly |
| Comparative Example 1 | Co—Cr sputtering film | 0.25 | Good | Film exfoliates | Not good |
|  | Ni—P plated film | 0.16 | Shaved and scarred | Film exfoliates Resin adheres | Not good |
|  | Co$\gamma$-Fe$_2$O$_3$ film | 0.25 | Good | Film scarred and then exfoliates | Not good |
| Comparative Example 2 | Co—Cr sputtering film | 0.16 | Shaved and scarred | Film exfoliates Resin adheres | Not good |
|  | Ni—P plated film | 0.16 | Shaved and scarred | Film exfoliates Resin adheres | Not good |
| Comparative Example 3 | Co—Cr sputtering | 0.14 | Shaved and | Lump of resin | Not good |

TABLE 2-continued

| | | Dynamic Friction Properties | | | |
|---|---|---|---|---|---|
| Model Base Substance | Film of Recording Medium | Dynamic Friction Coefficient | Sliding Surface of Base Substance | Condition of Film Surface of Recording Medium | Overall Evaluation |
| | film Ni—P plated film | 0.14 | scarred Shaved and scarred | adheres Lump of resin adheres | Not good |

Particularly important are the visual observations of the of the sliding surface of the base substance and the condition of the film surface of the recording medium. Model base substances according to the present invention gave outstanding results while those of the prior art did not.

Figure 10:
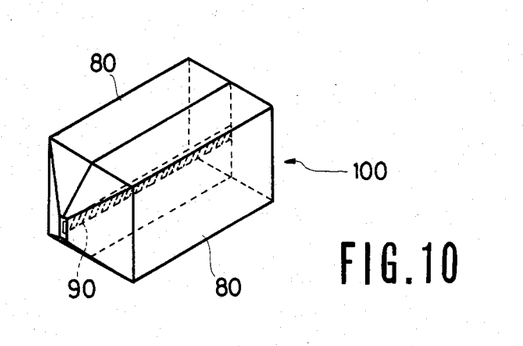
FIG. 10 is a perspective view of the magnetic head according to one embodiment of the present invention.

The next series of experiments report studies of different support members used to make a magnetic pole head as shown in FIG. 10 and the effect of the support member on the recording medium that it contacts. Electrical and magnetic properties were also measured.

Film coated with γ-type diiron trioxide adherent to cobalt was parepared according to the following mixing ratio:

| | (Weight %) |
|---|---|
| Fe₂O₃ powder adherent to cobalt (axial diameter 0.3 μm, axial ratio 1/8) | 30.0 |
| lecithin | 0.9 |
| Copolymer of PVC - vinyl acetate (VAGH of Union Carbide Co.) | 5.5 |
| Polyurethane resin (Nippon 2304 of Nippon Polyurethane Ind. Co.) | 2.5 |
| Methylethylketone/toluene (Weight ratio 1:1) | 61.1 |

The above mixture was kneaded in the ball mill for 24 hours to prepare magnetic paint, which was applied onto a polyester film by a 50 μm applicator and hot air dried after magnetic orientation, followed by calender processing to obtain a film coated with γ-type diiron trioxide adherent to cobalt.

EXAMPLE 6

Figure 9:
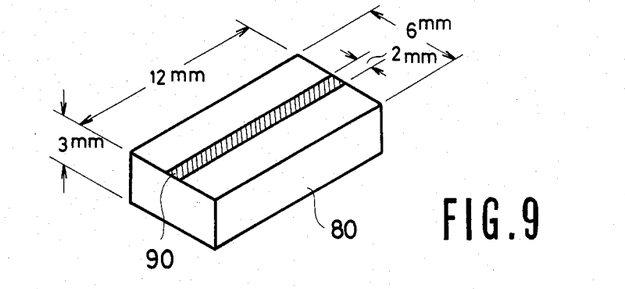
FIG. 9 is a perspective view showing the support member and the magnetic soft metal film used in one embodiment of the magnetic head according to the present invention.

The glass-like carbon material used in Example 2 was cut out in the shape and size (unit:mm) shown in FIG. 9 to obtain a support member 80. Magnetic soft metal film 90 (0.7 μm thick, 2 mm wide, Cu-Mo Permalloy film) was evaporated on the support member 80 by the sputtering method. The metal film is shown by the hatched line in FIG. 9. Another identical support member 80 without the magnetic soft metal film 90 evaporated thereon was placed atop support member 80 evaporated with the magnetic soft metal film 90 and bonded by an epoxy adhesive (manufactured by Ciba-Geigy under the commercial name of Araldite). The surface which comes in contact with the recording medium was shaved and sharpened to obtain the main magnetic pole head 100 in the shape as shown in FIG. 10.

The pointed tip is further ground using wrapping tape (manufactured by Nippon Micro-Coating) to smoothen the tip surface.

The main magnetic pole head and a magnetic tape of Co-Cr sputtering film having the recording capacity of 30000 bit/inch were used to measure the reproduce voltage drop rate and the envelope waveform. The condition of the surfaces of the Co-Cr sputtering film and the main magnetic pole head were visually observed 5 hours after the measurement started. The result is shown in Table 3.

EXAMPLE 7

The carbon material used in Example 4 was cut out in the shape and size as shown in FIG. 9 to obtain the main magnetic pole head in the same manner as in Example 6 for measurement and observation identical with Example 6. The result is shown in Table 3.

COMPARATIVE EXAMPLE 4

Alumina ceramics used in Comparative Example 1 was cut out in the shape and size shown in FIG. 9 and subjected to the same processes as in Example 6 to obtain the main magnetic pole head for measurement and observation identical with Example 6. The result is shown in Table 3.

COMPARATIVE EXAMPLE 5

The main magnetic pole head as obtained in Comparative Example 4 was coated with a lubricant (stearic amide), lightly wiped with a cloth and subjected to the same measurement and observation as in Embodiment 6. The result is shown in Table 3.

TABLE 3

| Main Magnetic Pole Head | Reproduce Voltage Drop Rate | Envelope Waveform | Co—Cr Perpendicular Film Surface | Surface of Main Magnetic Pole Head |
|---|---|---|---|---|
| Example 6 | less than 3% | Good | Good | Good |
| Example 7 | less than 3% | Good | Good | Good |
| Comparative Example 4 | 5% | Not good | Not good (scarred) | Not good (dust adheres and scarred) |
| Comparative Example 5 | 4% | Not good | Not Good (scarred) | Not good (dust adheres and scarred) |

EXAMPLE 8

The glass-like carbon material used in Example 2 was used to form the non-magnetic base substance 1 and the non-magnetic protective plate 10 as shown in FIGS. 1-3. The thin film magnetic head comprising this non-magnetic base substance 1 and the non-magnetic protective plate 10 was placed in sliding contact with a magnetic disc of Ni-P plated thin metal film to measure the reproduce voltage drop rate and the envelope waveform at the recording density of 5000 bit/inch. The wear of the thin metal film at its surface and the thin film magnetic head at its tip was visually observed after 300,000 times headload. The result is shown in Table 4.

EXAMPLE 9

The composite glass-like carbon material obtained in Example 3 was used to form the non-magnetic base substance 1 and the non-magnetic protective plate 10 as shown in FIGS. 1-3 to build up the thin film magnetic head. The thin film magnetic head and the Ni-P plated metal film magnetic disc were used for measurement and observation as in Example 8. The result is shown in Table 4.

COMPARATIVE EXAMPLE 6

Alumina ceramic used in Comparative Example 1 was used to form the non-magnetic base substance 1 and the non-magnetic protective plate 10 as shown in FIGS. 1-3 to build up the thin film magnetic head. The thin film magnetic head and the Ni-P metal film magnetic disc were used for measurement and observation as in Example 8. The result is shown in Table 4.

COMPARATIVE EXAMPLE 7

The thin film magnetic head obtained in Comparative Example 6 was coated with a lubricant (stearic amide), lightly wiped with a cloth and subjected to the measurement and observation described in Example 8. The result is shown in Table 4.

TABLE 4

| Non-magnetic Base Substance | Reproduce Voltage Drop Rate | Envelope Waveform | Surface of Metal Film Disc | Surface of Thin Film Magnetic Head |
|---|---|---|---|---|
| Example 8 | Less than 3% | Good | Good | Good |
| Example 9 | Less than 3% | Good | Good | Good |
| Comparative Example 6 | 10% | Not good | Not good (Scarred) | Not good (Dust adheres and scarred) |
| Comparative Example 7 | 5% | Not good | Not good (Scarred) | Not good (Dust adheres and scarred) |

Discussion of test results: As is evident from Tables 2-4, the thin film magnetic head and the magnetic head for a perpendicular recording system made of the non-magnetic base substance according to the present invention have excellent lubricating action without causing damage to the sliding surface of the head or the recording medium coming into contact with the head. These magnetic heads are excellent in their electric characteristics at the time of reproduction.

EXAMPLE 10

A cast-molded aggregate of furanoid glasslike carbon material with a density of 1.49 g/cm$^3$, shore hardness of 112 and thermal conductivity of 3 Kcal/m hr°C. was cut out in the appropriate shape and size as shown in FIG. 8, and the surface C in sliding abutment with the recording medium and the surface D on which the thin film is to be formed were gradually subjected to coarse to fine grinding, followed by a specular surface finish with emery paper #15000 to prepare a model base substance 70. The surface D with specular finish was observed using the scanning type electron microscope. No voids greater than 0.5 μm but voids smaller than 0.01 μm in diameter were found on the surface.

For evaluating the abrasion resistance properties of the model base substance 70 and the recording medium, the dynamic friction property was measured using an abrasion test device on the surface C of the base substance 70 in contact with the film coated with γ-Fe$_2$O$_3$ adherent to Co, Ni-P plated film and thin film resulting from Co-Cr sputtering. Visual observation of the condition of the surface C of the base substance 70 and the surface of the magnetic recording medium were also conducted. The abrasion test device used in this procedure was capable of measuring the dynamic friction property in the condition simulating the actual use as described in Japanese Patent Application Laid-open No. Sho 55-128142.

The model base substance 70 was then sectioned along the broken line E—E' of FIG. 8. The surface D of one of the sections was formed with a thin film of Co-Zr-Nb alloy of 1 μm in thickness by sputtering. The surface D of the other section was similarly formed with a thin film of Co-Zr-Nb alloy of 0.3 μm in thickness by sputtering. After heat treating these thin films in a circular magnetizing filed, the coercive force of the films was measured using a vibrating magnetism measuring apparatus adapted for magnetic soft metal film. The result is shown in Table 6.

EXAMPLE 11

A cast-molded aggregate of furanoid glasslike carbon material with a density of 1.47 g/cm$^3$, shore hardness of 100 and thermal conductivity of 7 Kcal/m hr°C. was processed in the same manner as in Example 10 to prepare the model base substance 70 shown in FIG. 8. Surface D thereof was observed using a scanning type electron microscope. No void greater than 0.5 μm but voids smaller than 0.05 μm in diameter were found on the surface.

The abrasion resistance properties of the model base substance 70 as against the recording medium and coercive force of the thin film were measured in the same manner as in Example 10. The thin film used here was prepared in the same manner as in Example 10. The results are shown in Tables 5 and 6.

EXAMPLE 12

A cast-molded aggregate of phenolic glass-like carbon material with a density 1.45 g/cm$^3$, shore hardness of 78 and thermal conductivity of 15 Kcal/m hr° C was processed in the same manner as in Example 10 to prepare the model base substance 70 shown in FIG. 8. Surface D thereof was observed using a scanning type electron microscope. No void greater than 0.5 μm but voids smaller than 0.2 μm in diameter were found on the surface.

The abrasion resistance properties of the model base substance 70 with the recording medium and coercive force of the thin film were measured in the same manner as in Example 10. The thin film used here was prepared in the same manner as in Example 10. The results are shown in Tables 5 and 6.

EXAMPLE 13

A compression-molded aggregate of a glass-like composite comprising phenolic glass-like carbon fiber (manufactured by Nippon Kynol under the registered trademark of Kynol) (70% by volume) and laminating general use resol resin (30% by volume) and having a density of 1.46 g/cm$^3$ was processed in the same manner as in Example 10 to prepare the base model substance 70 shown in FIG. 8. Surface D thereof was observed using a scanning type electron microscope. No void greater than 0.5 μm but voids smaller than 0.4 μm in diameter were found on the surface.

The abrasion resistance properties of the model base substance 70 with the recording medium and coercive force of the thin film were measured in the same manner as in Example 10. The thin film used here was prepared in the same manner as in Example 10. The results are shown in Tables 5 and 6.

COMPARATIVE EXAMPLE 8

A cast-molded aggregate of a furanoid glass-like carbon material with a density of 1.37 g/cm$^3$, shore hardness of 80 and thermal conductivity of 10 Kcal/m hr°C. was processed in the same manner as in Example 10 to prepare the model base substance 70 as shown. Surface D thereof was observed using a metallurgical microscope. Voids 0.6 to 0.7 μm in diameter as well as voids smaller than 0.5μm were found on the surface.

The coercive force of the model base substance 70 and the thin film of the recording medium were measured. The thin film used here was prepared in the same manner as in Example 10. The result is shown in Table 6.

COMPARATIVE EXAMPLE 9

A cast-molded aggregare of a phenolic glass-like carbon material with a density of 1.35 g/cm$^3$, shore hardness of 70 and thermal conductivity of 13 Kcal/m hr°C. was processed in the same manner as in Example 10 to prepare a model base substance 70. Surface D thereof was observed using a metallurgical microscope. Voids 0.9 to 1.1 μm in diameter as well as voids smaller than 0.5 μm were found on the surface.

The coercive force of the model base substance 70 and the thin film of the recording medium were measured. The thin film used here was prepared in the same manner as in Example 10. The result is shown in Table 6.

COMPARATIVE EXAMPLE 10

Alumina ceramic (manufactured by Nippon Electric Glass Co. under the commercial name of Neoceram) was processed in the same manner as in Example 10 to prepare the model base substance 70. Surface D thereof was observed using a scanning type electron microscope. No void greater than 0.5 μm but voids smaller than 0.02 μm in diameter were found on the surface.

The abrasion resistance properties of the model base substance 70 with the recording medium were measured in the same manner as in Example 10. The result is shown in Table 5.

Discussion of test results: As is evident from Tables 5 and 6, the base substance for a magnetic head according to the present invention proved to have excellent lubricating action with the recording medium without causing damage either to the sliding surface of the head or to the recording medium, lower in coercive force and overall superior in magnetic properties as measured against the comparative samples.

TABLE 5

| | Abrasion Resistance Properties | | | |
|---|---|---|---|---|
| Model Base Substance | Film of Recording Medium | Dynamic Friction Coefficient | Sliding Surface of Base Substance | Condition of Film Surface of Recording Medium |
| Example 10 | Coγ-Fe$_2$O$_3$ film | 0.18 | Good | Good |
| | Ni—P plated film | 0.12 | Good | Good |
| | Co—Cr sputtering film | 0.12 | Good | Good |
| Example 11 | Coγ-Fe$_2$O$_3$ film | 0.17 | Good | Good |
| | Ni—P plated film | 0.11 | Good | Good |
| | Co—Cr sputtering film | 0.11 | Good | Good |
| Example 12 | Coγ-Fe$_2$O$_3$ film | 0.15 | Good | Good |
| | Ni—P plated film | 0.13 | Good | Good |
| | Co—Cr sputtering film | 0.13 | Good | Good |
| Example 13 | Coγ-Fe$_2$O$_3$ film | 0.17 | Good | Good |
| | Ni—P plated film | 0.13 | Good | Good |
| | Co—Cr sputtering film | 0.12 | Good | Good |
| Comparative Example 10 | Coγ-Fe$_2$O$_3$ film | 0.25 | Good | Film exfoliates |
| | Ni—P plated film | 0.25 | Good | Film exfoliates |
| | Co—Cr sputtering film | 0.25 | Good | Film exfoliates |

TABLE 6

| | Coercive Force of Film (Unit: Oe) | | |
|---|---|---|---|
| Model Base | Film Thickness 1.0 μm | Film Thickness 0.3 μm | Evaluation of Magnetic Property |
| Example 10 | 0.08 | 0.2 | Good |
| Example 11 | 0.08 | 0.3 | Good |
| Example 12 | 0.20 | 0.6 | Slightly good |
| Example 13 | 0.44 | 0.7 | Slightly good |
| Comparative Example 8 | 0.70 | 2.0 | Bad |
| Comparative Example 9 | 1.00 | 5.0 or more* | Bad |

*means the value exceeds the measurement limit of 5.0 Oe of the device

EXAMPLE 14

Figure 11:
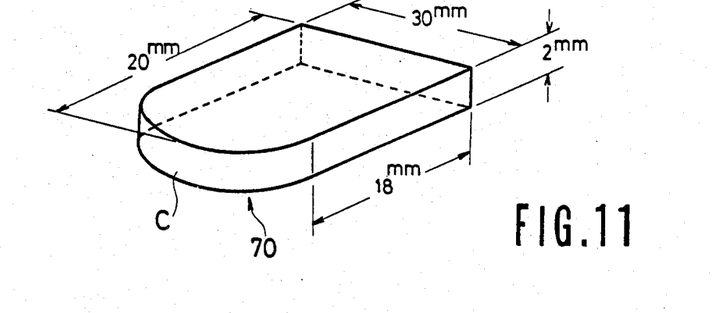
FIG. 11 is a perspective view of a model base substance according to still another embodiment of the present invention.

A glass-like carbon material with an apparent density of 1.5, shore hardness of 112 and thermal conductivity of 3 Kcal/m hr°C. was cut out in the shape and size shown in FIG. 11, and the surface D placed in sliding abutment with the recording medium. Prior to testing thue magnetic head was subjected to coarse to fine grinding, followed by specular surface finishing with emery paper #15000 to prepare the model base substance 70.

EXAMPLE 15

A glass-like carbon material with an apparent density 1.45, shore hardness of 78 and thermal conductivity of 15 Kcal/m hr°C. was used to prepare a model base substance in the same manner and shape as in Example 14.

EXAMPLE 16

A compression-molded composite glass-like carbon material comprising phenolic glass-like carbon fiber (manufactured by Nippon Kynol under the registered tradename of Kynol) (70% by volume) and a laminating general use resol resin (30% by volume) were used to prepare a model base substance in the same manner and shape as in Example 14.

EXAMPLE 17

An aggregate of composite material comprising furanoid glass-like carbon material (90% by volume) and carbon black 0.1 μm in diameter (10% by volume) were used to prepare a model base substance in the same manner and shape as in Example 14.

COMPARATIVE EXAMPLE 11

Alumina ceramic (manufactured by Nippon Electric Glass Co. under the commercial name of Neoceram) was used to prepare a model base substance in the same manner and shape as in Example 14.

Sliding Property Test

The dynamic friction property of the model base substance according to Examples 14–17 and Comparative Example 11 with the film coated with γ-type diiron trioxide adherent to Co, respectively, was measured using the previously described abrasion test device, and the sliding surface C of the model base substance and the film of the recording medium were visually observed.

The result is shown in Table 7. The abrasion test device employed in this measurement is capable of determining the dynamic friction property simulating actual use as described in Japanese Patent Application Laid-Open No. Sho 55-128142. "Overall evaluation" in the table below refers to the result of overall evaluation incorporating both the sliding surface of the head and the film surface of the recording medium. The film coated with γ-diiron trioxide adherent to Co was obtained in the same manner as in Examples 1–3.

ml of $C_2H_5OH$, 2 mg of $CuCl_2.2H_2O$ and 40 ml of $H_2O$) and ground with a grinding cloth to obtain a film 30 μm thick.

Preparation of a Support Member: An aggregate of glass-like carbon material used in Example 14 was ground with alumina oxide 0.5 to 1.0 μm in particle size to obtain a thin plate 0.1 μm thick.

Figure 12A:
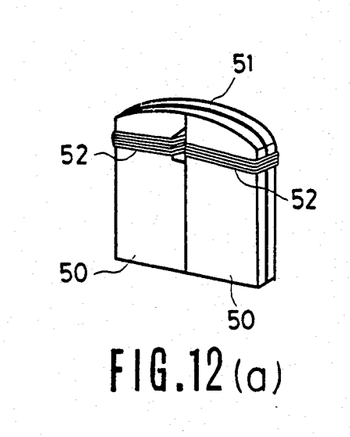
FIG. 12(a) is a perspective view of the magnetic head according to one embodiment of the present invention.
Figure 12B:
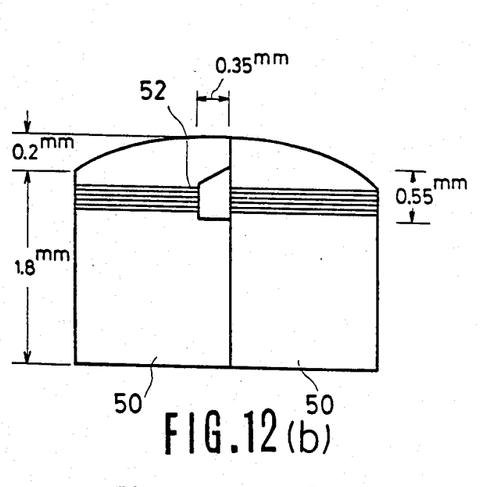
FIG. 12(b) is the front view thereof.
Figure 12C:
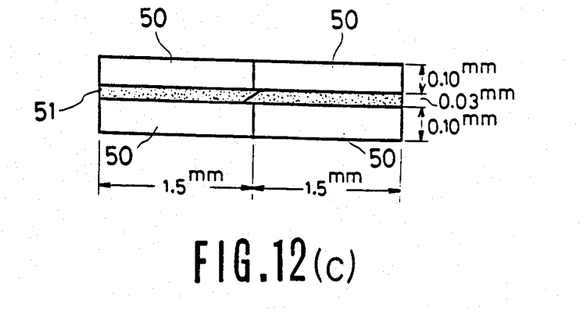
FIG. 12(c) is the plane view thereof.

Preparation of a Magnetic Head: The amorphous alloy film and the thin plate made of the glass-like carbon material were cut out in the predetermined shape and size and were bonded together with an epoxy adhesive (manufactured by Ciba-Geigy under the commercial name of Araldite), over which an insulated copper wire 40 μm in diameter was wound for 15 turns to obtain a magnetic head as depicted in FIG. 12. In FIG. 12, reference numeral 50 denotes the support member, 51 the amorphous alloy film, and 52 the coils. An amorphous alloy film prepared by a sputtering method can be used for the magnetic head. In other words, an amorphous alloy film can be laminated by a sputtering method over a substrate made of an aggregate of glass-like carbon material and subsequently bonded and wound with wire to obtain the magnetic head as shown in FIG. 12.

COMPARATIVE EXAMPLE 12

Figures 13A, 13B, 13C:
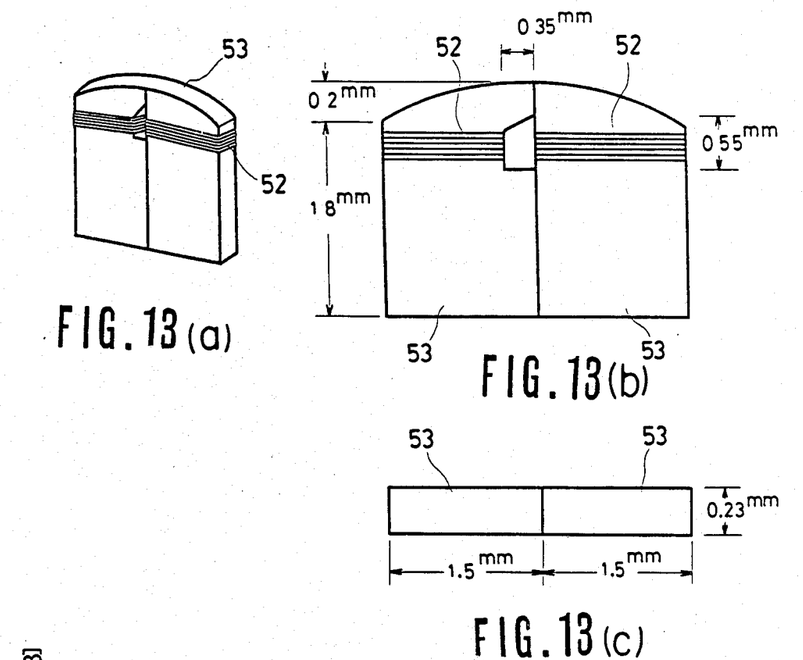
FIG. 13(a) is a perspective view of the magnetic head according to a comparative embodiment.
FIG. 13(b) is the front view thereof.
FIG. 13(c) is the plane view thereof.

The thin sheet of amorphous alloy used in Example 18 was wound according to the method employed in Example 18 to obtain a thin plate 0.23 μm in thickness. The thin plate was cut out in the predetermined shape and size, wound with insulated copper wire for 15 turns to obtain the magnetic head having the dimensions as shown in FIG. 13. The reference numerals identical with those in FIG. 12 refer to identical components. Reference number 53 denotes the thin plate of amorphous alloy.

Testing of the Magnetic Head: The magnetic head obtained in Example 18 and Comparative Example 12, as well as the magnetic head of Mn-Zn ferrite presently available for general use as a reference (in identical shape and size as the head obtained in Comparative Example 12), were measured for chronological changes

TABLE 7

| Film of Recording Medium | Material of Support Member | Dynamic Coefficient | Sliding Surface of Base Substance | Surface Condition of Recording Medium | Overall Evaluation |
| --- | --- | --- | --- | --- | --- |
| Film coated with γ-type oxide adherent to Co | Example 14 | 0.17 | Good | Good | Good |
|  | Example 15 | 0.16 | Good | Good | Good |
|  | Example 16 | 0.21 | Good | Good | Good |
|  | Example 17 | 0.20 | Good | Good | Good |
|  | Comparative Example 11 | 0.25 | Good | Film scarred and then exfoliates | Not good |

EXAMPLE 18

Preparation of a Head Core for Magnetic Recording: An alloy composed of Co, Fe, Mn, Si and B (composition ratio by weight=Co 71.5:Fe 2.5:Mn 3.0:Si 8.0) was rolled into a thin metal sheet by a single roll method known in the art. The diffraction pattern of the alloy was studied using an X-ray diffraction device to confirm the alloy to be amorphous; the diffraction pattern showed no sharp peaks peculiar to crystals.

Figure 14:
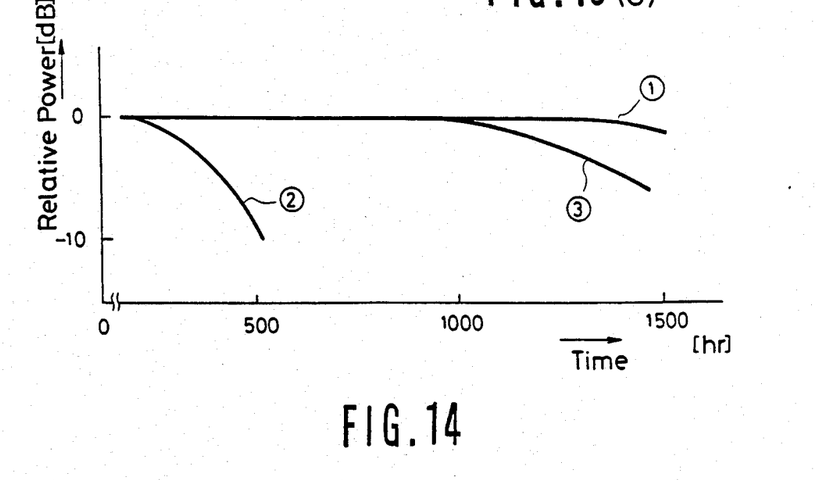
FIG. 14 is a graph indicating the characteristics of the magnetic heads according to the present invention and the comparative embodiment, respectively.

The thin sheet of amorphous alloy was then ground with alumina oxide 1 to 3 μm in particle size, eroded in an etching solution (containing 60 g of $FeCl_3 \cdot 6H_2O$, 40 in the relative reproduction output with respect to the initial value of a signal at 1000 KHz. The result is shown in the graph of FIG. 14. The ordinate in FIG. 14 represents the relative reproduction output and the abscissa the time lapse. The line designated by numeral (1) shows the characteristics of the magnetic head according to the present invention as obtained in Example 18, line 2 show the magnetic head according to Comparative Example 12, and line 3 shows the magnetic head of Mn-Zn ferrite presently available for general use.

The magnetic recording medium used in the test is a magnetic tape which was obtained by the method described above and had coercive force of about 700 Oe and a residual magnetic flux density of about 1200 G. The magnetic tape was run at a speed of 5.8 m/sec. The measurement was conducted by replacing the tape with a new one every 50 hours.

Wear of the magnetic head as the magnetic tape slid over the head was also measured. The magnetic tape was running at a velocity of 15 m/sec, and the wear was measured after 20 hours. The resuls are shown in Table 8.

TABLE 8

| Magnetic Head | Example 18 | Comparative Example 12 | Mn—Zn ferrite |
|---|---|---|---|
| Relative Wear | 1 | 20.0 | 2.0 |

The amount of wear is expressed in relative values based on the wear of the magnetic head according to Example 18 of the present invention as "1".

As is evident from Tables 7 and 8 and FIG. 12, the magnetic head according to the present invention is excellent in slidability over the magnetic recording medium without causing damage to the recording medium, highly resistant against wear and has excellent magnetic properties.

What is claimed:

1. A magnetic head comprising a converter for writing or reading on a magnetic recording medium, the converter including a converter support made of an aggregate of a glass-like carbon material or a composite material comprising an aggregate of glass-like carbon material and thermosetting resin and/or carbonaceous filler.

2. The magnetic head as claimed in claim 1 in which said aggregate of carbon material is composed of a crystalline carbon material.

3. The magnetic head as claimed in claim 1 in which the magnetic head is adapted for a perpendicular magnetic recording system which records by utilizing a magnetic field having component perpendicular to a planar extent of the magnetic recording medium, the recording medium having an axis of magnetization perpendicular to the planar extent of the recording medium and wherein the converter support is made of a non-magnetic base substance, the converter also including a thin film member of the magnetic soft metal having a high magnetic permeability and a saturated magnetic flux density supported by a surface of the converter support.

4. The magnetic head as claimed in claim 3 in which the surface of the non-magnetic base substance on which the thin film member is formed is highly smooth and has a density of at least 1.40 g/cm$^3$.

5. The magnetic head as claimed in claim 1 in which the converter support is made of a non-magnetic base substance and the converter comprises:
a plurality of thin film layers including a converter gap layer formed on a surface of the non-magnetic base substance; and
a non-magnetic thin film protective plate which covers the thin film layers.

6. The magnetic head as claimed in claim 5, in which the non-magnetic protective plate is composed of a glass-like carbon material.

7. The magnetic head as claimed in claim 5 in which the surface of the non-magnetic base substance on which the thin film layers are to be formed is highly smooth and has a density of at least 1.40 g/cm$^3$.

8. An abrasion-resistant magnetic read/write head for reading from and recording onto high density magnetic media, the magnetic head comprising a read/write converter and a base supporting said converter made of an aqgregate of a wear-resistant carbon-containing composite material containing carbon uniformly dispersed in a thermosetting resin matrix and optionally containing a carbonaceous filler, the carbon-containing composition having a density of at least 1.40 g/cm$^3$, provided that the surface of the base support coming into sliding contact with the magnetic media is smooth and has no voids greater than about 0.5 $\mu$m in diameter.

9. The abrasion resistant magnetic read/write head as claimed in claim 8 in which the composite material contains at least 40% by volume of the thermoplastic resin.

10. The abrasion resistant magnetic read/write head as claimed in claim 8 in which the smooth surface has a specular finish.

11. The abrasion resistant magnetic read/write head as claimed in claim 8 in which the smooth surface is free from voids greater than 0.1 $\mu$m in diameter.

12. The magnetic head as claimed in claim 1 in which the converter includes a magnetic head core adjacent to the converter support, the head core being made of a magnetic material and wherein the magnetic head is adapted for a longitudinal recording system which magnetizes magnetic particles of the recording medium is a direction parallel to a planar extent of the magnetic recording medium.

* * * * *